Aug. 8, 1967     M. H. SHAMOS     3,334,643

CONSTANT FLOW SYSTEM

Filed Feb. 18, 1965

INVENTOR
MORRIS H. SHAMOS
BY
ATTORNEY

United States Patent Office 3,334,643
Patented Aug. 8, 1967

3,334,643
CONSTANT FLOW SYSTEM
Morris H. Shamos, New York, N.Y., assignor to Technicon
Corporation, a corporation of New York
Filed Feb. 18, 1965, Ser. No. 433,600
10 Claims. (Cl. 137—98)

ABSTRACT OF THE DISCLOSURE

A constant rate of flow, liquid supply apparatus has a closed container with a liquid outlet and a gas inlet, with a control device coupled therebetween to provide a change in the rate of flow of the gas inlet which is inversely responsive to the change in the rate of flow of the liquid outlet. The control means includes a curved conduit, through which the liquid passes, and whose change in curvature is coupled to valve through which the gas passes.

---

This invention relates to constant liquid-flow systems which may be used for various purposes in lieu of a pump.

It is sometimes desired to maintain a constant flow of liquid in a closed system regardless of changes in ambient conditions or of changes in resistance within the system. This is normally accomplished by means of a positive displacement or metering pump, which forces a definite quantity of liquid through the system during each cycle. Depending upon the type of pump used, this kind of system can be independent of resistance variations over a fairly wide range.

When pressure heads, rather than displacement pumps, are used to produce the liquid flow, it is not sufficient to maintain a constant head at the input end of the system. As the resistance changes in the system the flow rate will also change, unless the pressure head changes to compensate for it. Two basic techniques may be employed to achieve such compensation. First, a flowmeter may be installed at some point in the system and used to control the flow by feeding back a signal which either varies the pressure head accordingly or regulates a variable restriction in the system so as to maintain constant flow. Another method is to maintain constant pressure drop across the entire system. This involves monitoring the pressure at the output end of the system, and, by means of a suitable feedback signal, adjusting the head pressure so that the difference remains constant. If the physical dimensions of the system remain constant, maintaining a constant pressure drop across it ensures uniform flow.

While workable, such systems are relatively complex and costly. The proposed system according to the primary object of my invention has the advantages of simplicity and low cost, while at the same time offering a range of control that is adequate for most purposes.

The above and other objects of the invention, which might hereinafter appear, will now be described with reference to the accompanying illustrative drawings in which.

Figure 1:
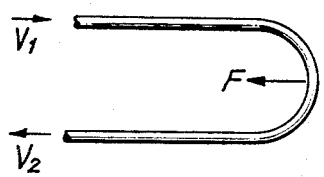
FIG. 1 is a plan view of a length of pipe referred to in the explanation of the principle on which the invention is based.

The system is based upon the force required to change the momentum of a liquid flowing in a curved pipe. For example, consider a pipe as shown in FIG. 1, having cross-sectional area $A$ and carrying a liquid of density $d$ at speed $v$. The liquid enters the curved section of pipe with velocity $\vec{v}_1$ and leaves with velocity $\vec{v}_2$, where $|\vec{v}_1|=|\vec{v}_2|=v$, the vertical lines denoting absolute values of the respective velocities. Thus, $\vec{v}_1=-\vec{v}_2$ and the net change in velocity is $2\vec{v}_1$. Applying Newton's second law in momentum form, we have, since the rate of change of momentum equals the net applied force:

$$\vec{F}=d.A.v(2\vec{v}_1)$$

But $|\vec{v}_1|=v$, so that in scalar form:

$$F=2dAv^2 \qquad \text{(Equation 1)}$$

This shows that the force required to redirect the liquid stream is proportional to the square of the flow rate for a pipe of uniform cross-section. The effect upon the pipe, i.e., the reaction force, is a tendency to straighten it, just as a coiled garden hose tends to straighten out when water flows through it. The effect is enhanced if instead of a single loop the pipe has a number of loops or is wound in a continuous coil.

Figure 2:
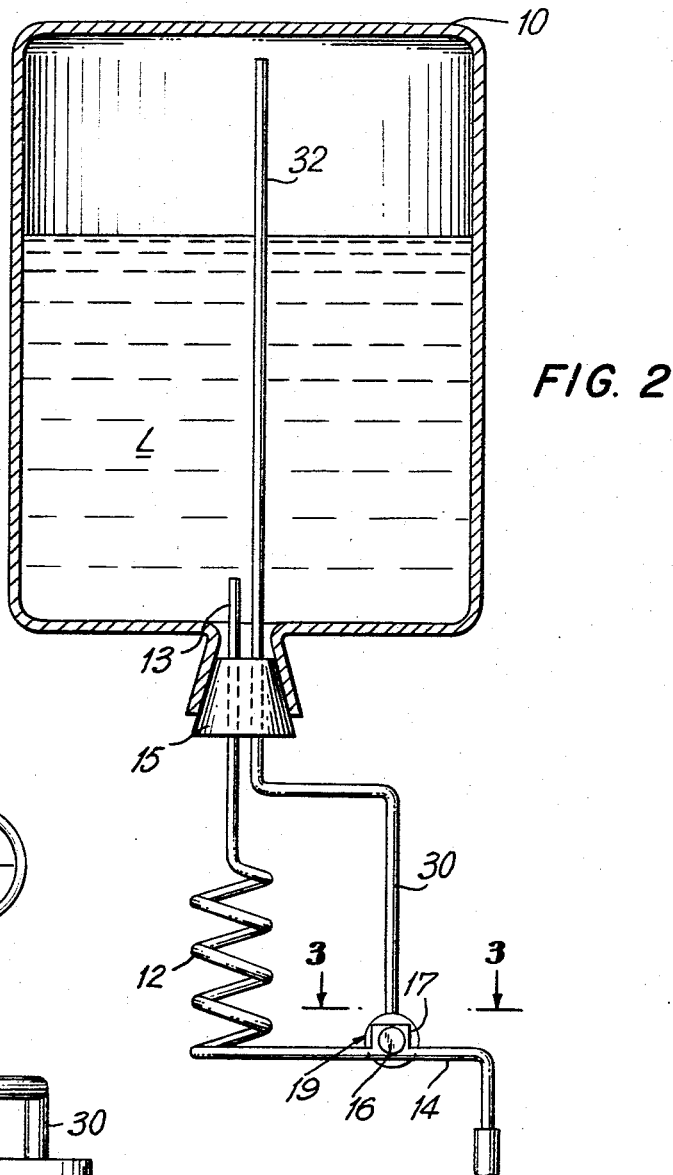
FIG. 2 is a side view of a constant flow system according to the invention.
Figure 3:
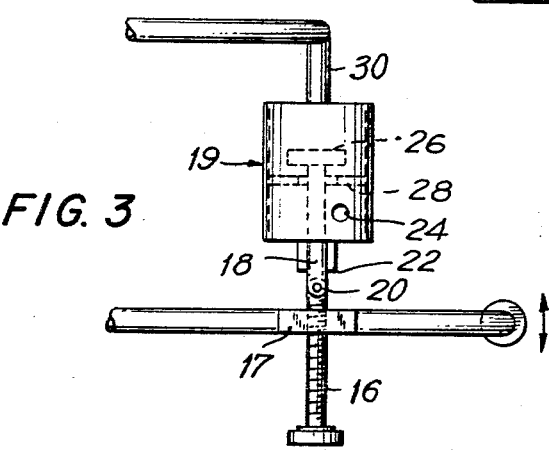
FIG. 3 is a view on a larger scale on the line 3—3 of FIG. 2.

The basic details of the system are shown in FIG. 2. The liquid L is stored in a closed container 10 and flows into the system through the coiled pipe 12, which includes the liquid outlet tube 13 which extends through the closure 15 of the container. The pipe 12 is constructed of a flexible but rigid material that is chemically inert to the liquid, as, for example, thin-wall stainless steel or Monel metal or heavier wall "Teflon" or other suitable plastic. The position of the free end 14 of the coiled pipe now depends upon the rate at which the liquid enters the system, in accordance with Eq. 1. Fastened to this end of the pipe by a threaded lug 17 is a screw 16 which is connected to valve stem 18 of valve 19 at the articulated joint indicated at 20 (FIG. 3). Said valve stem is movable rectilinearly in the guide 22. An air inlet is indicated at 24 and the valve body 26 is movable in relation to valve seat 28. The outlet of the valve is connected to a tube 30 which communicates with tube 32 the upper end of which is above the level of the liquid in the container. The valve at the end of the screw 16 provides a variable air leak into the container through the valve 19.

It will be seen that the rate at which liquid will flow into the system from container 10 depends not only upon the pressure head of the liquid (gravity and/or gas pressure) and the impedance of the system, but also upon the rate at which air is permitted to leak into the container to replace the liquid. In a sense, placing a variable constriction such as valve 19 in the air input to the container 10 is equivalent to placing a variable constriction (or impedance) in the system proper.

Initial adjustment of the air leak (and hence rate of flow) is accomplished by means of the screw 16. Thereafter, any tendency for the flow to change is compensated by the motion of the free end of the pipe; i.e., should the impedance of the system suddenly increase (due to a partial obstruction, for example), resulting in a tendency toward decreased flow, the motion of the pipe is such as to increase the air leakage rate into the container so as to compensate for the change.

Since the reaction force, and hence the twist of the coiled pipe, is proportional to the square of the flow velocity, it is evident that the system is inherently quite sensitive.

The pressure head producing the flow may be either a gravity head, in which case the valve 19 simply leaks atmospheric air into the container, or a high pressure head, in which case the valve inlet 24 is connected to a high pressure gas supply.

A plurality of devices such as the above described device may be used in place of a plurality of pumps having the same or different flow rates. Such plurality of devices could thus be used instead of all or part of proportioning pump means, and could be used for transmitting liquids in an automatic analysis system, for example, but without limitation, in the analysis apparatus of the United States patent to Skeggs No. 2,797,149.

What is claimed is:

1. Constant rate of flow, liquid-flow apparatus, comprising a closed container for a liquid, said container having an outlet for said liquid, means for admitting a gaseous fluid into said container above the level of the liquid in the container, and means responsive to the flow of liquid from said container for controlling inversely the flow of said gaseous fluid into the container through said admitting means.

2. Constant rate of flow, liquid-flow apparatus, comprising a closed container for a liquid, said container having an outlet for said liquid, means for admitting a gaseous fluid into said container above the level of the liquid in the container, and means responsive to increase of the flow of liquid out of said container for decreasing the flow of said gaseous fluid into the container.

3. Constant rate of flow, liquid-flow apparatus, comprising a closed container for a liquid, said container having an outlet for said liquid, means for admitting a gaseous fluid into said container above the level of the liquid in the container, and means responsive to the flow of liquid from said container for controlling the flow of said gaseous fluid into the container through said admitting means, said liquid-flow responsive means comprising a tube through which the liquid from said outlet flows, a portion at least of said tube being curved and resistively assuming a greater radius of curvature with increase of the rate of flow of the liquid therethrough.

4. Constant rate of flow, liquid-flow apparatus, comprising a closed container for a liquid, said container having an outlet for said liquid, means for admitting a gaseous fluid into said container above the level of the liquid in the container, said gaseous fluid admitting means including an adjustable valve, and means responsive to the rate of flow of liquid from said container for adjusting said valve for controlling the flow of said gaseous fluid into said container inversely in relation to the rate of flow of the liquid from said container.

5. Constant rate of flow, liquid-flow apparatus, comprising a closed container for a liquid, said container having an outlet for said liquid, means for admitting a gaseous fluid into said container above the level of the liquid in the container, said gaseous fluid admitting means including an adjustable valve, and means responsive to the rate of flow of liquid from said container for adjusting said valve for controlling the flow of said gaseous fluid into said container inversely in relation to the rate of flow of the liquid from said container, said liquid-flow responsive means being operatively connected to said valve and comprising a tube through which the liquid from said outlet flows, a portion at least of said tube being curved and resistively assuming a greater radius of curvature with increase of the rate of flow of the liquid therethrough.

6. Constant rate of flow, liquid-flow apparatus, comprising a closed container for a liquid, said container having an outlet for said liquid, means for admitting a gaseous fluid into said container above the level of the liquid in the container, and means responsive to the rate of flow of liquid from said container for controlling inversely the flow of said gaseous fluid into the container through said admitting means.

7. Constant rate of flow, liquid-flow apparatus, comprising a closed container for a liquid, said container having an outlet for said liquid, means for admitting a gaseous fluid into said container above the level of the liquid in the container, and means responsive to the rate of flow of liquid from said container for controlling inversely the flow of said gaseous fluid into the container through said admitting means, said liquid-flow responsive means comprising a tube through which the liquid from said outlet flows, a portion at least of said tube being curved and resistively assuming a greater radius of curvature with increase of the rate of flow of the liquid therethrough.

8. Constant rate of flow, liquid-flow apparatus, comprising a closed container for a liquid, said container having an outlet for said liquid, means for admitting a gaseous fluid into said container above the level of the liquid in the container, said gaseous fluid admitting means including an adjustable valve, and means responsive to the rate of flow of liquid from said container for adjusting said valve for controlling the flow of said gaseous fluid into said container inversely in relation to the rate of flow of the liquid from said container, said liquid-flow responsive means being operatively connected to said valve and comprising a tube through which the liquid from said outlet flows, a portion at least of said tube being curved and resistively assuming a greater radius of curvature with increase of the rate of flow of the liquid therethrough, and means for initially adjusting said valve independently of said liquid-flow responsive means.

9. Constant rate of flow, liquid-flow apparatus, comprising a closed container for a liquid, said container having an outlet for said liquid, means for admitting a gaseous fluid into said container above the level of the liquid in the container, said gaseous fluid admitting means including an adjustable valve, and means responsive to the rate of flow of liquid from said container for adjusting said valve for controlling the flow of said gaseous fluid into said container inversely in relation to the rate of flow of the liquid from said container, and means for initially adjusting said valve independently of said liquid-flow responsive means.

10. Constant rate of flow, liquid-flow apparatus, comprising a closed container for a liquid, said container having an outlet for said liquid, means for admitting a gaseous fluid into said container above the level of the liquid in the container, said gaseous fluid admitting means including an adjustable valve, and means responsive to the rate of flow of liquid from said container for adjusting said valve for controlling the flow of said gaseous fluid into said container inversely in relation to the rate of flow of the liquid from said container, said liquid-flow responsive means being operatively connected to said valve and comprising a tube through which the liquid from said outlet flows, a portion at least of said tube being curved and resistively assuming a greater radius of curvature with increase of the rate of flow of the liquid therethrough, and means for initially adjusting said valve independently of said liquid-flow responsive means, said liquid-flow responsive means carrying said means for initially adjusting said valve inversely in relation to the rate of t he liquid from said container.

References Cited
UNITED STATES PATENTS

| 360,697 | 4/1887 | Howes | 137—209 X |
| 527,678 | 10/1894 | Francis | 137—209 |
| 859,157 | 7/1907 | Warren | 222—478 |

WILLIAM F. O'DEA, *Primary Examiner.*

D. J. ZOBKIW, *Assistant Examiner.*